Patented June 6, 1950

2,510,257

UNITED STATES PATENT OFFICE 2,510,257

POLYVINYL ACETATE EMULSIONS CONTAINING GLYOXAL

William D. Robinson, Niagara Falls, N. Y., assignor to E. I. du Pont de Nemours & Company, Wilmington, Del., a corporation of Delaware No Drawing. Application April 27, 1946, Serial No. 665,625

7 Claims. (Cl. 260—29.6)

This invention relates to polyvinyl acetate emulsions, and more particularly it relates to aqueous polyvinyl acetate emulsions, containing polyvinyl alcohol as an emulsifying agent, which can be laid down in the form of a film, coating, layer or the like, and dried to a substantially water-insensitive structure.

Aqueous polyvinyl acetate emulsions have been used extensively as adhesives for leather, paper, cellulose acetate and the like, as well as for textile sizes and finishes. Such polyvinyl acetate emulsions are preferably made with small quantities of polyvinyl alcohol as the emulsifying agent because of the exceedingly efficient emulsifying action of the polyvinyl alcohol. Although the above-mentioned uses have been extensive, such polyvinyl acetate emulsions have not been altogether satisfactory in cases where the resulting film, coating or layer should have a low sensitivity to water. Even though polyvinyl acetate is, per se, quite water insensitive, the resultant dried structure was often objectionably water sensitive due to the presence of the polyvinyl alcohol emulsifying agent. The polyvinyl alcohol present in the dried structure tended to redisperse the polyvinyl acetate when wetted or moistened with water. As a consequence, the above-described polyvinyl acetate emulsions were greatly limited in their uses.

If, for example, a film or layer of an aqueous polyvinyl acetate emulsion, containing polyvinyl alcohol as a dispersing agent, is laid down on a surface and allowed to dry, the resulting structure is sufficiently water sensitive that it can be readily rubbed off by first wetting with water and rubbing the same with the hand in its wetted or moistened condition. This is due to the dispersing action of the polyvinyl alcohol on the polyvinyl acetate.

It has been proposed, heretofore, to insolubilize the polyvinyl alcohol emulsifying agent contained in an aqueous emulsion of polyvinyl acetate by converting the hydrophilic groups of the emulsifying agent to hydrophobic groups by alkylation, acylation, or acetalization. Such previously known processes, however, were subject to one or more objections which made them quite unsatisfactory. Previously known substances which would function to convert the hydrophilic groups to hydrophobic groups had one or more of the following objectionable properties:

(1) The necessity of adding the substance to the polyvinyl acetate emulsion after the latter had been laid down as a film, coating, or layer in order to prevent premature precipitation of the polyvinyl acetate from the emulsion.

(2) The necessity of incorporating the substance in the emulsion with a sufficient quantity of acid catalyst to impart a low pH value, of the order of 2.5 or less, to the entire emulsion. Such substance involved the use of a critical proportion of acid catalyst, i. e., a sufficient quantity to be operative yet not so much as to cause premature precipitation. The use of such substance also frequently necessitated the employment of steps to remove excess acid from the resulting structure.

(3) The necessity of very quickly applying the polyvinyl acetate emulsion immediately after incorporating the substance therein. This often involves the application of an inferior emulsion by reason of partial precipitation of the polyvinyl acetate.

(4) The necessity of after-treating, by heating or in some other manner, the film, coating, or layer before, during, or after the drying thereof.

It is, therefore, an object of the present invention to provide aqueous polyvinyl acetate emulsions, containing polyvinyl alcohol, which will dry in the form of a substantially water-insensitive structure.

It is another object of this invention to increase the water insensitivity of films, coatings, and layers obtained by drying applications of aqueous polyvinyl acetate emulsions containing polyvinyl alcohol.

It is still another object of this invention to provide aqueous polyvinyl acetate emulsions containing polyvinyl alcohol and a substance that will not destroy or break up the emulsion while the latter contains a substantial amount of water but which will cause the emulsion to dry in the form of a substantially water-insensitive structure.

Other objects of the invention will appear hereinafter.

By "substantially water-insensitive structure" is meant a structure in which there is no noticeable tendency on the part of the emulsifying or dispersing agent to redisperse the polyvinyl acetate in the presence of water or moisture. This can be readily determined by holding an object containing a dried film of the polyvinyl acetate under water and rubbing the same with the finger. If the film easily rubs off it is considered to be water sensitive, if it cannot be rubbed off, or can only be rubbed off with difficulty, it is considered to be substantially water insensitive.

The objects of this invention may be accomplished, in general, by forming an aqueous emulsion of polyvinyl acetate, containing at least 30% water, polyvinyl alcohol, and, as an agent to cause insolubilization of the polyvinyl alcohol, between 0.1% and 1.0%, by weight, of the solids in the emulsion, of glyoxal.

It has been found, in accordance with this invention, that glyoxal is not subject to the above-mentioned objectionable properties of other insolubilizing materials, and that it can be incorporated in an aqueous emulsion of polyvinyl acetate containing polyvinyl alcohol, which emulsion contains at least 30% of water, without noticeably insolubilizing the polyvinyl alcohol. The insolubilization does not appear to take place until sufficient water has been evaporated from the film or coating by drying to concentrate the emulsion to a water content of less than 30%. An aqueous polyvinyl acetate emulsion of the kind above described containing at least 30% water may contain between 0.1% and 1.0% glyoxal, based on the weight of the solids in the emulsion, for comparatively long periods of time (several days) without insolubilizing the polyvinyl alcohol or affecting the stability of the emulsion. The glyoxal may have a slight thickening effect on the emulsion, the degree of thickening being dependent upon the amount of glyoxal added. The slightly thickened emulsion, however, can be diluted with water to its original consistency, if desired, without any apparent effect on the stability of the emulsion. Moreover, the polyvinyl acetate emulsion does not have to have a low pH value to make the glyoxal effective to insolubilize the polyvinyl alcohol as the film or coating dries. Polyvinyl acetate emulsions of the type referred to usually have a pH value of between 4 and 5, and upon occasion it is desired to raise the pH value to 7 or 8. The glyoxal, when present in the emulsion in the amount above specified, is operative in the same manner and to the same extent regardless of any pH value between 1 and 8 of the emulsion. Furthermore, the film, coating, or layer of polyvinyl acetate emulsion does not have to be heated during or after drying, or treated in any other manner, to make the glyoxal content effective to insolubilize the polyvinyl alcohol as the structure dries. The applied emulsion may be dried in any conventional manner, for example, at atmospheric temperature conditions. On the other hand, incidental heating of the film or coating, for example, to more rapidly remove water therefrom, does not unfavorably affect the action of the glyoxal. Other aldehydes, for example formaldehyde and butyraldehyde, previously suggested for use in acetalization of polyvinyl alcohol, do not function in the unique manner of glyoxal, and therefore have been found unsatisfactory as insolubilizing agents in polyvinyl acetate compositions containing polyvinyl alcohol.

The employment of glyoxal in aqueous polyvinyl acetate emulsions, as an agent to insolubilize the polyvinyl alcohol contained therein as an emulsifying agent, is applicable to all such aqueous emulsions as long as they contain at least 30% water. Aqueous polyvinyl acetate emulsions of this type usually contain between 35% and 55% water and between 2% and 5% polyvinyl alcohol, the remainder being composed of polyvinyl acetate. It is sometimes desirable to increase the viscosity or consistency of the acetate emulsion by adding larger amounts of polyvinyl alcohol. Glyoxal may be used, in accordance with this invention, to insolubilize the polyvinyl alcohol of any polyvinyl acetate-polyvinyl alcohol aqueous emulsion containing at least 30% water.

The glyoxal is preferably added to the polyvinyl acetate emulsion in the form of an aqueous solution, for example a 20% to 50% solution, because of its availability commercially in this form. Glyoxal, in the form of its 100% liquid, tends to polymerize rapidly and is, therefore, not as desirable as the aqueous solution.

The following examples are given to illustrate, in detail, preferred methods of practicing the invention, it being understood that the details given in these examples are not to be considered as limiting the scope of the invention.

*Example I*

A polyvinyl acetate emulsion containing about 3% by weight of 88% hydrolyzed polyvinyl alcohol as an emulsifying agent, said emulsion containing about 55% total solids and having a pH of 4.56, was spread on a glass surface to form a film or coating. The film was allowed to dry under room atmospheric conditions for about 30 minutes. The resulting dried film was quite water sensitive as determined by wetting the same with water and rubbing the same with the finger. The film could be easily rubbed off the glass surface.

*Example II*

To 100 parts of the emulsion of Example I was added 1.8 parts of 30% aqueous solution of glyoxal and thoroughly mixed therewith. The pH of the mixture was 4.05. A film of this mixture was spread on a glass surface in the same manner as in Example I and allowed to dry at room atmospheric conditions for thirty minutes. The dried film was substantially water insensitive and could not be redispersed or removed by rubbing with the finger with the film under water.

*Example III*

To 100 parts of a polyvinyl acetate emulsion, containing 10% by weight of polyvinyl alcohol and 55% total solids, and having a pH of 4.5, are added 1.8 parts of 30% aqueous solution of glyoxal and thoroughly mixed therewith. A film of this mixture is spread on a glass surface in the same manner as in Example I and allowed to dry at room atmospheric conditions for thirty minutes. The dried film when held under water could not be removed by rubbing with the finger and was considered substantially water insensitive.

*Example IV*

A polyvinyl acetate emulsion was formed in the same manner as in Example II except that only 0.18 parts of 30% solution of glyoxal in water was mixed with 100 parts of the acetate emulsion. The pH of the mixture was 4.53 as determined by a Beckman pH meter. A film was cast on a glass surface in the same manner as in the above three examples, and the film dried for thirty minutes under atmospheric conditions. The dried film was substantially water insensitive and could not be redispersed or removed by rubbing with the finger with the film under water.

*Example V*

To 100 parts by weight of the polyvinyl acetate emulsion of Example I was added 2.8 parts of benzaldehyde (5% on the solids content of the emulsion). A coating of the resulting mixture was applied to glass and allowed to dry at atmospheric conditions for two to three hours. The dry film had poor water resistance, being no better than the polyvinyl acetate emulsion film of Example I.

*Example VI*

Three grams (3 g.) of 37% aqueous formaldehyde solution were added to 200 g. of the polyvinyl acetate emulsion of Example I and thoroughly mixed. A film was formed on glass and dried for one hour at room temperature. The resulting dry film had no better water resistance than the unmodified film of Example I.

*Example VII*

Two and eight-tenths grams (2.8 g.) of isobutyraldehyde were added to 100 grams of the polyvinyl acetate emulsion of Example I and mixed thoroughly. A film on glass after drying eighteen to twenty hours at room temperature had poor water resistance, being no better in this respect than the unmodified polyvinyl acetate emulsion film of Example I.

The employment of glyoxal in accordance with the principles of the present invention not only impels the more extensive use of polyvinyl acetate aqueous emulsions containing polyvinyl alcohol for previously known and practiced operations, but advances its use for new purposes and operations where such polyvinyl acetate aqueous emulsions were, heretofore, either unsatisfactory or inconvenient to use, or would produce films, coating, or layers which were not sufficiently water insensitive.

It is well known that polyvinyl alcohols which are commonly used as emulsifying agents in polyvinyl acetate aqueous emulsions are not always 100% hydrolyzed polyvinyl alcohols, but frequently consist of water-soluble, partially hydrolyzed polyvinyl alcohol. The term "polyvinyl alcohol" as used throughout the specification and claims is, therefore, intended to include both completely hydrolyzed and partially hydrolyzed polyvinyl alcohols which are useful as emulsifying agents in polyvinyl acetate aqueous emulsions.

Reference in the specification and claims to parts, proportions, and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. An aqueous polyvinyl acetate emulsion containing at least 30% by weight of water, water-soluble polyvinyl alcohol in sufficient amount to function as an emulsifying agent, and 0.1% to 1.0%, based on the weight of total solids in the emulsion, of glyoxal.

2. An aqueous polyvinyl acetate emulsion containing at least 30% by weight of water, 2% to 5% by weight of water-soluble polyvinyl alcohol, and 0.1% to 1.0%, based on the weight of total solids in the emulsion, of glyoxal.

3. An aqueous polyvinyl acetate emulsion having a pH of between 4 and 8 and containing at least 30% by weight of water, water-soluble polyvinyl alcohol in sufficient amount to function as an emulsifying agent, and 0.1% to 1.0%, based on the weight of total solids in the emulsion, of glyoxal.

4. An aqueous polyvinyl acetate emulsion having a pH of between 4 and 8 and containing at least 30% by weight of water, 2% to 5% by weight of water-soluble polyvinyl alcohol, and 0.1% to 1.0%, based on the weight of total solids in the emulsion, of glyoxal.

5. The process which comprises adding to an aqueous emulsion of polyvinyl acetate containing water-soluble polyvinyl alcohol in sufficient amount to function as an emulsifying agent and at least 30% by weight of water, between 0.1% and 1.0%, based on the weight of total solids in the emulsion, of glyoxal.

6. The process which comprises adding to an aqueous emulsion of polyvinyl acetate containing at least 30% by weight of water, and 2% to 5% by weight of water-soluble polyvinyl alcohol, between 0.1% and 1.0%, based on the weight of total solids in the emulsion, of glyoxal.

7. The process which comprises adding to an aqueous emulsion of polyvinyl acetate containing at least 30% by weight of water and 2% to 5% by weight of water-soluble polyvinyl alcohol, an aqueous solution of glyoxal containing between 0.1% and 1.0%, based on the weight of total solids in the emulsion, of glyoxal.

WILLIAM D. ROBINSON.

REFERENCES CITED

The following references are of record in the file of this patent:

UNITED STATES PATENTS

| Number | Name | Date |
| --- | --- | --- |
| 2,169,250 | Izard | Aug. 15, 1939 |
| 2,227,163 | Starck | Dec. 31, 1940 |
| 2,387,831 | Cogan et al. | Oct. 30, 1945 |

FOREIGN PATENTS

| Number | Country | Date |
| --- | --- | --- |
| 356,408 | Great Britain | Sept. 10, 1931 |
| 542,286 | Germany | Jan. 22, 1932 |

OTHER REFERENCES

British Plastics, vol. 16, Feb. 1944, pages 81–82.